US011894699B2

(12) United States Patent
Michiwaki (10) Patent No.: US 11,894,699 B2
(45) Date of Patent: Feb. 6, 2024

(54) POWER RECEIVING-TYPE INFORMATION TRANSMISSION DEVICE AND INFORMATION TRANSMISSION SYSTEM

(71) Applicant: NejiLaw Inc., Tokyo (JP)

(72) Inventor: Hiroshi Michiwaki, Tokyo (JP)

(73) Assignee: NejiLaw Inc., Tokyo (JP)

( * ) Notice: Subject to any disclaimer, the term of this patent is extended or adjusted under 35 U.S.C. 154(b) by 0 days.

(21) Appl. No.: 16/961,879

(22) PCT Filed: Jan. 11, 2019

(86) PCT No.: PCT/JP2019/000758
§ 371 (c)(1),
(2) Date: Oct. 1, 2020

(87) PCT Pub. No.: WO2019/139142
PCT Pub. Date: Jul. 18, 2019

(65) Prior Publication Data
US 2021/0159740 A1    May 27, 2021

(30) Foreign Application Priority Data
Jan. 12, 2018  (JP) .................... 2018-003873

(51) Int. Cl.
*H02J 50/90* (2016.01)
*H02J 50/80* (2016.01)
(Continued)

(52) U.S. Cl.
CPC .............. *H02J 50/90* (2016.02); *H02J 50/12* (2016.02); *H02J 50/80* (2016.02); *H04B 5/0037* (2013.01); *H04B 5/0075* (2013.01)

(58) Field of Classification Search
CPC .. H02J 50/90; H02J 50/12; H02J 50/80; H02J 2310/40; H02J 50/10; H04B 5/0037; H04B 5/0075; H04B 1/59; H04B 5/02
See application file for complete search history.

(56) References Cited

U.S. PATENT DOCUMENTS 10,198,678 B2 *  2/2019  Michiwaki ............ G01S 13/755
10,929,732 B2 *  2/2021  Michiwaki ............ G08C 17/00
(Continued)

FOREIGN PATENT DOCUMENTS

| CN | 1663864 A | 9/2005 |
|---|---|---|
| CN | 200950585 Y | 9/2007 |

(Continued)

OTHER PUBLICATIONS

Oxford, "definition of car," pp. 1-22 (Year: NA).*
(Continued)

*Primary Examiner* — Daniel Cavallari
(74) *Attorney, Agent, or Firm* — TraskBritt (57) ABSTRACT

A means for determining a place and a time at which maintenance is carried out by enabling objective measurement of the status of an object. A power receiving-type information transmission device that is provided in a long body, which is a measurement object, the power receiving-type information transmission device including power receiver for wirelessly receiving power supply from a moving body configured to be movable along a track, information acquisition receiver for acquiring information regarding a physical change occurring in the long body by consuming power obtained by the power receiving receiver, and transmitter for wirelessly transmitting the information to the moving body by consuming the power obtained by the power receiver.

12 Claims, 6 Drawing Sheets

(51) Int. Cl.
*H02J 50/12* (2016.01)
*H04B 5/00* (2006.01)

(56) References Cited

U.S. PATENT DOCUMENTS

| | | | | |
|---|---|---|---|---|
| 2009/0284227 | A1* | 11/2009 | Mohammadian | H02J 50/50 307/104 |
| 2010/0026318 | A1* | 2/2010 | Kroh | A61B 5/064 324/654 |
| 2010/0214177 | A1* | 8/2010 | Parsche | H01Q 1/2208 343/702 |
| 2010/0286898 | A1* | 11/2010 | Lin | G01S 13/91 701/119 |
| 2011/0133891 | A1* | 6/2011 | Krug | G06K 7/10316 340/10.1 |
| 2012/0049620 | A1* | 3/2012 | Jansen | H04B 5/0043 307/9.1 |
| 2012/0303939 | A1* | 11/2012 | Cain | H02J 50/23 713/1 |
| 2012/0325979 | A1* | 12/2012 | Yoon | B61L 25/025 246/122 R |
| 2013/0169398 | A1* | 7/2013 | Sugita | H01Q 1/002 336/179 |
| 2016/0079766 | A1* | 3/2016 | Jeong | H02J 50/80 307/104 |
| 2017/0005519 | A1* | 1/2017 | Lee | H02J 50/80 |

FOREIGN PATENT DOCUMENTS

| | | | |
|---|---|---|---|
| CN | 103178328 A | | 6/2013 |
| CN | 104015756 A | | 9/2014 |
| CN | 107284474 A | | 10/2017 |
| CN | 107431501 A | | 12/2017 |
| JP | 2000230208 A | * | 8/2000 |
| JP | 2010-117310 A | | 5/2010 |
| JP | 2013-077973 A | | 4/2013 |
| JP | 2016-065754 A | | 4/2016 |
| JP | 2016-110668 A | | 6/2016 |
| JP | 2016-192635 A | | 11/2016 |
| KR | 20170115267 A | * | 10/2017 |
| WO | WO-2016159247 A1 | * | 10/2016 ......... G06K 19/0702 |

OTHER PUBLICATIONS

Free Dictionary"Definition of Aircraft Engine," pp. 1 (Year: NA).*
NSF, "Scaled Network Sensing," pp. 1 (Year: 2009).*
Bao, "Compressive sensing-based lost data recovery of fast-moving wireless sensing for structural health monitoring," Structural Control and Health Monitoring vol. 22, Issue 3 summary, pp. 1-3 (Year: 2014).*
Bao, "Compressive sensing-based lost data recovery of fast-moving wireless sensing for structural health monitoring," Struct. Control Health Monit. 2015; 22:433-448,Published online Jul. 29, 2014 (Year: 2014).*
Taylor, et.al."A mobile-agent-based wireless sensing network for structural monitoring applications," 2009 ,Meas. Sci. Technol. 20, pp. 1-14 (Year: 2009).*
Huston, et.al, "Wireless inspection of structures aided by robots," 2001, Proc. SPIE 4337, Health Monitoring and Management of Civil Infrastructure Systems, pp. 147-154 (Year: 2001).*
Merriam-Webster, "definition of Vehicle," pp. 1-3 (Year: NA).*
Bao, Yuequan, et al. "Compressive sensing-based lost data recovery of fast-moving wireless sensing for structural health monitoring." Structural Control and Health Monitoring 22.3 (2015): 433-448. (Year: 2015).*
International Search Report for International Application No. PCT/JP2019/000758, dated Mar. 12, 2019, 4 pages with English Translation.
International Written Opinion for International Application No. PCT/JP2019/000758, dated Mar. 12, 2019, 15 pages with English Translation.

* cited by examiner

POWER RECEIVING-TYPE INFORMATION TRANSMISSION DEVICE AND INFORMATION TRANSMISSION SYSTEM

TECHNICAL FIELD

The present invention relates to a power receiving-type information transmission device and an information transmission system that obtains power from external sources and transmit information.

BACKGROUND ART

Proposed is an information acquisition system that has a power receiving-type information acquisition and transmission device installed in a member with a conduction path in a building and regularly acquires stress that acts on the member with a conduction path (refer to, for example, Patent Document 1).

PRIOR ART DOCUMENT

Patent Document

[Patent Document 1] Japanese Unexamined Patent Application, First Publication No. 2016-065754

DISCLOSURE OF INVENTION

Technical Goals

However, for information acquisition systems of the related art, there has been no method in which, for example, power is fed to a power receiving-type information acquisition and transmission device using short-range (several millimeters to several meters depending on frequency bands) wireless communication such as a passive-type IC tag and stress that acts on a member with a conduction path is collected.

Therefore, an object of the present invention is to provide means for enabling regular or steady acquisition of information regarding a physical change occurring in a long body regardless of communication ranges and stably transmitting the acquired information to the outside.

Technical Solutions

A power receiving-type information transmission device of the present invention is a power receiving-type information transmission device that is provided in a long body, which is a measurement object, the power receiving-type information transmission device including power receiving means for wirelessly receiving power supply from a moving body configured to be movable along a track, information acquisition means for acquiring information regarding a physical change occurring in the long body by consuming power obtained by the power receiving means, and transmission means for wirelessly transmitting the information to the moving body by consuming the power obtained by the power receiving means.

In addition, the power receiving-type information transmission device of the present invention is characterized in that the information acquisition means acquires information of an amount of a physical change relative to a predetermined state as a criterion.

In addition, the power receiving-type information transmission device of the present invention is characterized in that the transmission means transmits information with a loop antenna, the power receiving means receives power with the loop antenna, and the power receiving-type information transmission device has electric storage means for storing power fed with the power receiving means.

In addition, the power receiving-type information transmission device of the present invention is characterized in that the long body is a fastening member and/or a stiff body, and, in a case where the long body is the fastening member, the loop antenna is disposed in a top portion and/or a front end portion of the fastening member.

In addition, the power receiving-type information transmission device of the present invention is characterized in that the power receiving means receives power supply by an electromagnetic induction method and the transmission means transmits the information by an electromagnetic induction method.

In addition, an information transmission system of the present invention is an information transmission system having the power receiving-type information transmission device of the present invention and a moving body having a driving device that is relatively movable relative to the power receiving-type information transmission device, in which the moving body has power supply means for supplying power to the power receiving-type information transmission device and receiving means for receiving information transmitted from the power receiving-type information transmission device.

In addition, the information transmission system of the present invention is characterized in that the power supply means supplies power by an electromagnetic induction method with a moving body-side loop antenna and the information receiving means receives information by an electromagnetic induction method with the moving body-side loop antenna.

In addition, the information transmission system of the present invention is characterized in that the power supply means supplies power by an electromagnetic induction method with a first moving body-side loop antenna and the information receiving means receives information by an electromagnetic induction method with a second moving body-side loop antenna.

In addition, the information transmission system of the present invention is characterized in that the moving body is a vehicle.

Effects of the Invention

According to the present invention, it is possible to enable regular or steady acquisition of information regarding a physical change occurring in a long body regardless of communication ranges and to stably transmit the acquired information to the outside.

EMBODIMENTS OF THE INVENTION

Figure 1:
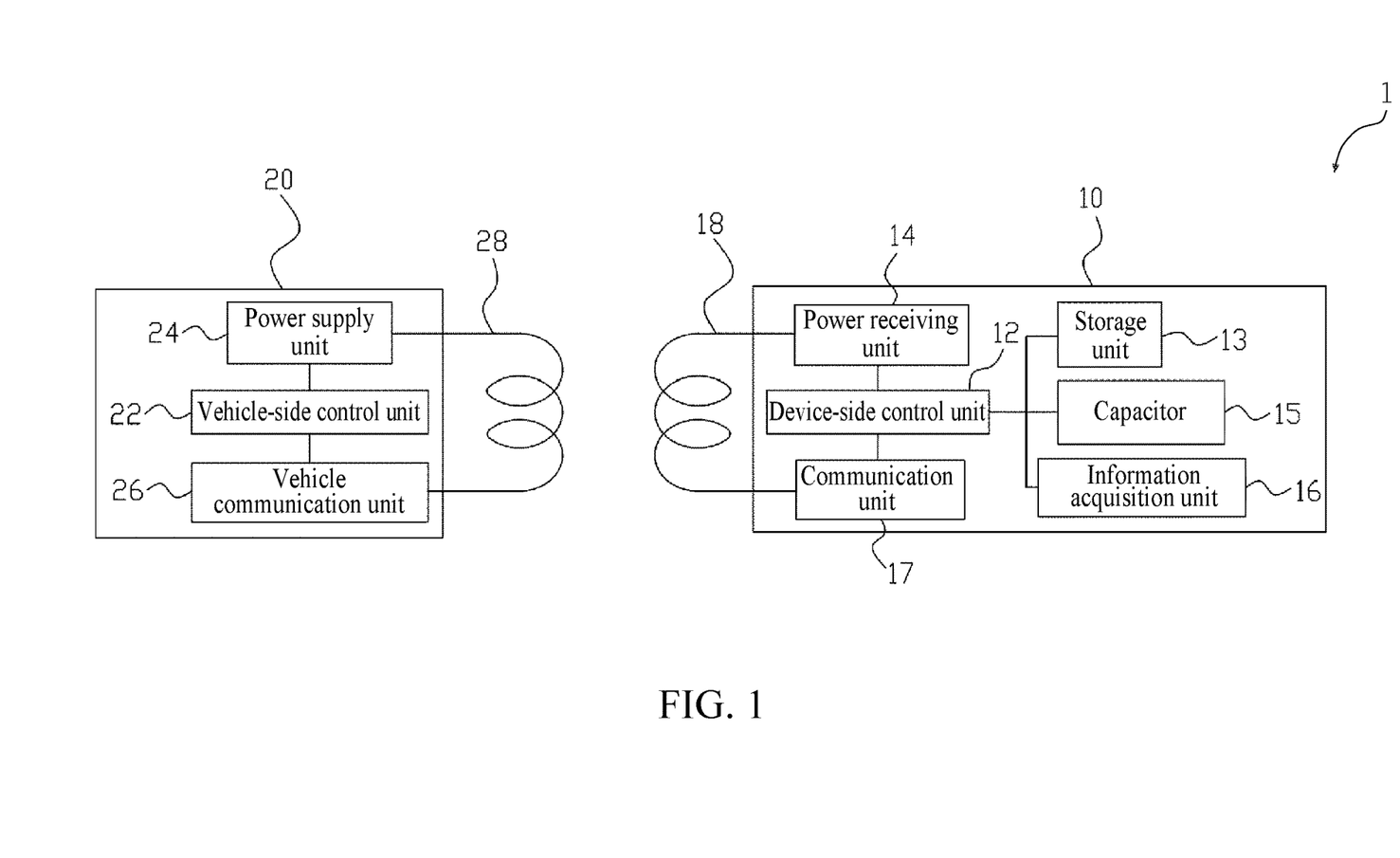
FIG. 1 is a block diagram showing an information transmission system according to the present embodiment.

Hereinafter, an embodiment of an information transmission system of the present invention will be described with reference to drawings. FIG. 1 is a block diagram showing an information transmission system 1 according to the present embodiment. The information transmission system 1 of the present invention has a power receiving-type information transmission device 10 that is provided in a long body, which is a measurement object, and a vehicle 20 (moving body) that is relatively movable relative to the power receiving-type information transmission device 10 and is movable along a track. The information transmission system 1 is configured to be capable of executing the transfer of power or the transmission and receival of information between the power receiving-type information transmission device 10 and the vehicle 20 in a wireless (non-contact) manner.

It should be noted that, as a method for carrying out the transfer of power or the transmission and receival of information in a wireless manner, any method of electrostatic induction, electromagnetic coupling, microwaves, and the like may be used. However in a case where the information transmission system is used outdoors, preferably used is the electromagnetic induction method (frequency: 125 kHz to 135 kHz and 13.56 MHz) that is less likely to be affected by rain, snow, hail, graupel, sleet, ice, dust, iron powder, or the like.

The power receiving-type information transmission device 10 includes a device-side control unit 12 configured to comprehensively control each unit. To the device-side control unit 12, a storage unit 13, a power receiving unit 14, a capacitor 15, an information acquisition unit 16, and a communication unit 17 are connected. The storage unit 13 is a so-called memory and stores in advance a predetermined program or an identifier that identifies each individual of the power receiving-type information transmission device 10. It should be noted that the storage unit 13 is configured to store setting information in the initial state of the power receiving-type information transmission device 10 or the like and may also be configured to be capable of storing the result of operation carried out in each unit of the power receiving-type information transmission device 10.

The power receiving unit 14 receives power supplied from the vehicle 20 through an antenna 18 such as a loop antenna and feeds the power to each unit. The capacitor 15 stores power that the power receiving unit 14 obtained. It should be noted that the capacitor 15 is capable of adopting a variety of structures and is capable of adopting, for example, a single plate-type structure, a swivel-type structure, a laminate-type structure, a penetration-type structure, an electrolysis-type structure, an electric double layer-type structure, and the like. There is no doubt that, instead of the capacitor 15, a battery capable of storing power such as a variety of storage batteries (secondary batteries) such as chemical battery-type storage batteries or physical battery-type storage batteries as electric storage means can also be adopted.

The information acquisition unit 16 includes a strain measurement sensor (a strain gauge and/or a pattern for strain measurement), an A/D converter configured to convert analog electric signals output from the sensor into digital electric signals, or the like, detects a physical change occurring in the long body, and acquires information regarding the physical change. The strain measurement sensor measures strain based on a change in voltage (or resistance value). In addition, the information regarding the physical change is the amount of a change relative to the initial state of the long body that is included in the setting information (predetermined state) as a criterion, and the information acquisition unit 16 acquires the amount of a change in strain relative to the strain measured at the initial stage of installation as the criterion.

In addition, the information acquisition unit 16 may include a gyroscope sensor, a temperature sensor, or the like. In that case, the information regarding the physical change is the amount of a change in posture relative to the posture (slope and direction) at the initial stage of installation as the criterion in the gyroscope sensor and is the amount of a change in temperature relative to the temperature at the initial stage of installation as the criterion in the temperature sensor.

It should be noted that, when the strain measurement sensor and the temperature sensor are jointly used, it is possible to exclude the influence of temperature on the strain from the strain measured with the strain measurement sensor. That is, strain excluding the influence of temperature can be acquired by carrying out a correction process on the strain measured with the strain measurement sensor based on the temperature measured with the temperature sensor. It should be noted that the correction process may be executed by circuit correction in the information acquisition unit 16 or executed by an operation process in the device-side control unit 12 or may be executed in both the information acquisition unit 16 and the device-side control unit 12.

In addition, the information acquisition unit 16 may have, in addition to the above-described sensors, for example, an acceleration sensor, a pressure sensor, an odor sensor, a specific particle sensory sensor, a radiation sensor, a wet sensor, a position sensor (GPS), a human detecting sensor, a light sensor, a sound sensor, a magnetic sensor, a current sensor, a rotation angle sensor, an image sensor, or the like.

The communication unit 17 transmits a variety of information to the vehicle 20 through the antenna 18. It should be noted that the device-side control unit 12 consumes part of power obtained with the power receiving unit 14 to cause the information acquisition unit 16 to carry out an information acquisition process and stores part of the power in the capacitor 15. In addition, the device-side control unit 12 consumes the power stored in the capacitor 15 to cause the communication unit 17 to carry out a transmission process.

Furthermore, the power receiving-type information transmission device 10 may have rectifying means for rectifying the power that the power receiving unit 14 obtained.

It should be noted that the track is not limited to a structure laid on the road surface of a road in order to enable railway vehicles to travel and means a path along which moving bodies move. Therefore, the track includes the concept of a rail for railway vehicles, a road that a variety of vehicles pass, and the like.

In addition, the vehicle 20 is a so-called railway vehicle, construction vehicle, agricultural vehicle, industrial vehicle, military vehicle, car, motorized bicycle, lightweight vehicle, trolley, or the like and includes a vehicle-side control unit 22 for controlling a variety of processes such as a power supply process or the receival of information through an antenna 28 (moving body-side antenna) such as a loop antenna. To the vehicle-side control unit 22, a power supply unit 24 configured to supply power to the power receiving-type information transmission device 10, a vehicle communication unit 26 configured to transmits and receives information to and from the power receiving-type information transmission device 10, and the like are connected.

Figure 2:
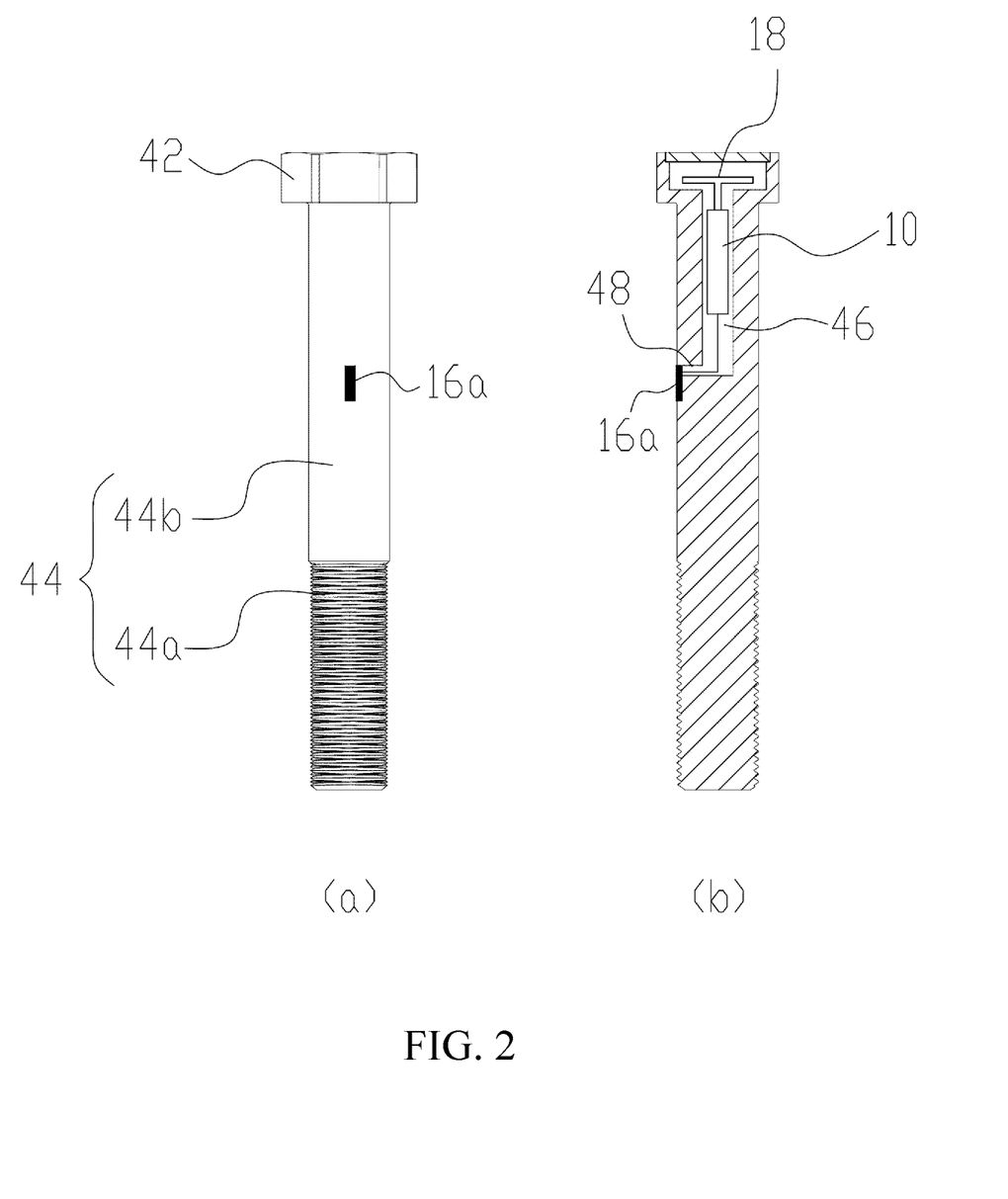
FIG. 2 is a view showing the appearance of a fastening member to which a power receiving-type information transmission device according to the present embodiment is applied.

Next, a bolt as a fastening member in which the power receiving-type information transmission device 10 is mounted will be described. FIG. 2 shows a bolt 40 in which the power receiving-type information transmission device 10 according to the present embodiment is mounted, FIG. 2(a) is a view showing the appearance, and FIG. 2(b) is a cross-sectional view. As shown in FIG. 2(a), the bolt 40 has a top portion 42 and a shaft portion 44. The top portion 42 is provided at one end of the shaft portion 44 and has an outer diameter shape having a large diameter compared with the shaft portion 44. The shaft portion 44 may have a screw portion 44a having a male screw groove formed on the other end side and a cylindrical portion 44b that is a screw thread-free region formed from the one end portion through the middle portion.

In addition, in the bolt 40, a hollow portion 46 is provided from the top portion 42. As shown in FIG. 2(b), the hollow portion 46 extends toward the top portion 42 and the cylindrical portion 44b. The hollow portion 46 has a space formed at one end side to enable the disposition of the antenna 18 in the top portion 42 and communicates at the other end side with an opening portion 48 formed on the outer circumferential surface of the cylindrical portion 44b. The opening portion 48 is formed so as to extend in the radial direction from the outer circumferential surface of the cylindrical portion 44b. That is, the opening portion 48 extends in a direction orthogonal to the hollow portion 46 and communicates with the hollow portion 46. In addition, in the top portion 42 of the bolt 40, a cap that blocks the opening of the hollowing portion 46 is provided.

The power receiving-type information transmission device 10 of the present invention is disposed in the hollow portion 46. In addition, the strain measurement sensor (pattern for strain measurement) 16a is disposed by directly forming a conduction path on the outer circumferential surface of the cylindrical portion 44b. In addition, the strain measurement sensor 16a is connected to the information acquisition unit 16 of the power receiving-type information transmission device 10 through a wire that passes the outer circumferential surface, the opening portion 48, and the hollow portion 46.

In addition, the antenna 18 is housed in the space on the one end side of the hollow portion 46, but the configuration is not limited thereto, and the antenna 18 may be disposed so as to, for example, surround the outer circumferential surface of the top portion 42. In that case, the hollow portion 46 is formed so as to penetrate the top portion 42, and the antenna 18 is drawn through the opening of the hollow portion 46.

As a method for directly forming the strain measurement sensor 16a on the outer circumferential surface of the cylindrical portion 44b, for example, there is a method in which an electric insulating layer is directly formed on the outer circumferential surface by lamination printing, pad printing, painting, plating, ink jet printing, or the like and the strain measurement sensor 16a is directly formed on the electric insulating layer. It should be noted that the method for forming the electric insulating layer is not limited to each method described above, and it is possible to employ a variety of methods. For example, the electric insulating layer may be formed by the formation of a coating by sputtering an insulating material in a state where a predetermined mask is disposed, or by a heating process on a silica material applied in a state where a predetermined mask is disposed, or by the application of a polyimide-based organic insulating material in a state where a predetermined mask is disposed.

In addition, the strain measurement sensor 16a is directly formed on the electric insulating layer by lamination printing, pad printing, painting, plating, ink jet printing, sputtering or the like in which a conductive paste is used. On both ends of the strain measurement sensor 16a, an electric contact pair is formed. To this electric contact pair, wires that are coated to be insulated respectively are connected, and voltage can be applied between the electric contact pair. Therefore, it is possible to detect distortion occurring in the cylindrical portion 44b and to detect the deformation of the cylindrical portion 44b with a change in the resistance value of the strain measurement sensor 16a to which voltage is applied between the electric contact pair. It should be noted that, as long as the shaft portion 44 (cylindrical portion 44b) is formed of an insulator material, the strain measurement sensor 16a may be directly formed on the outer circumferential surface of the cylindrical portion 44b.

In addition, in a case where the strain measurement sensor 16a is formed on the outer circumferential surface of the cylindrical portion 44b, the sliding contact of the strain measurement sensor 16a with a member to be fastened may be prevented by providing a recess in the cylindrical portion 44b and forming the strain measurement sensor 16a in the bottom portion of the recess. Furthermore, a coating layer that is excellent in terms of abrasion resistance, heat resistance, a moisture-blocking property, deformation resistance (adhesiveness), or the like may be formed so as to cover the strain measurement sensor 16a.

Figure 3:
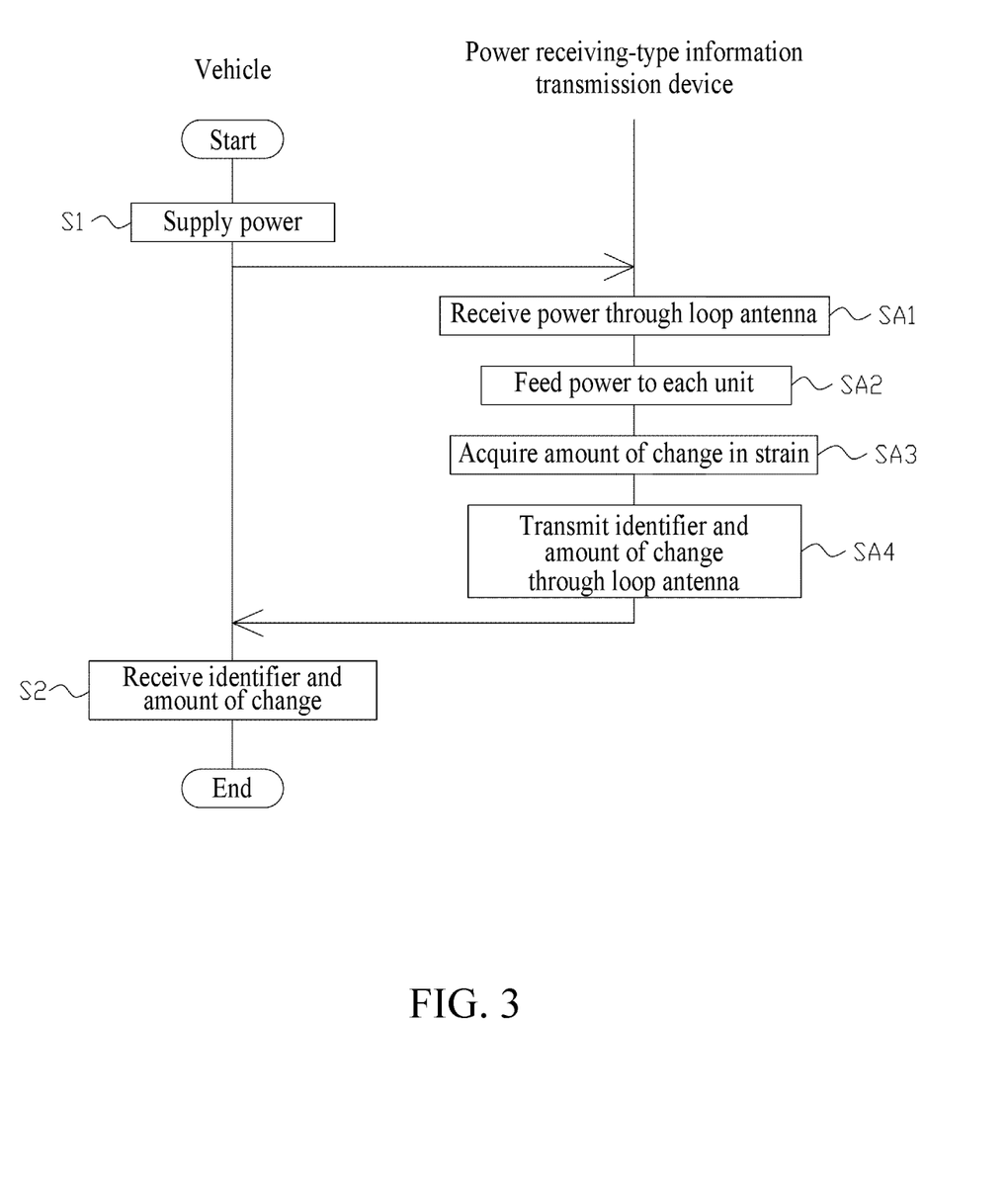
FIG. 3 is a flowchart showing an information transmission process in the information transmission system according to the present embodiment.
Figure 4:
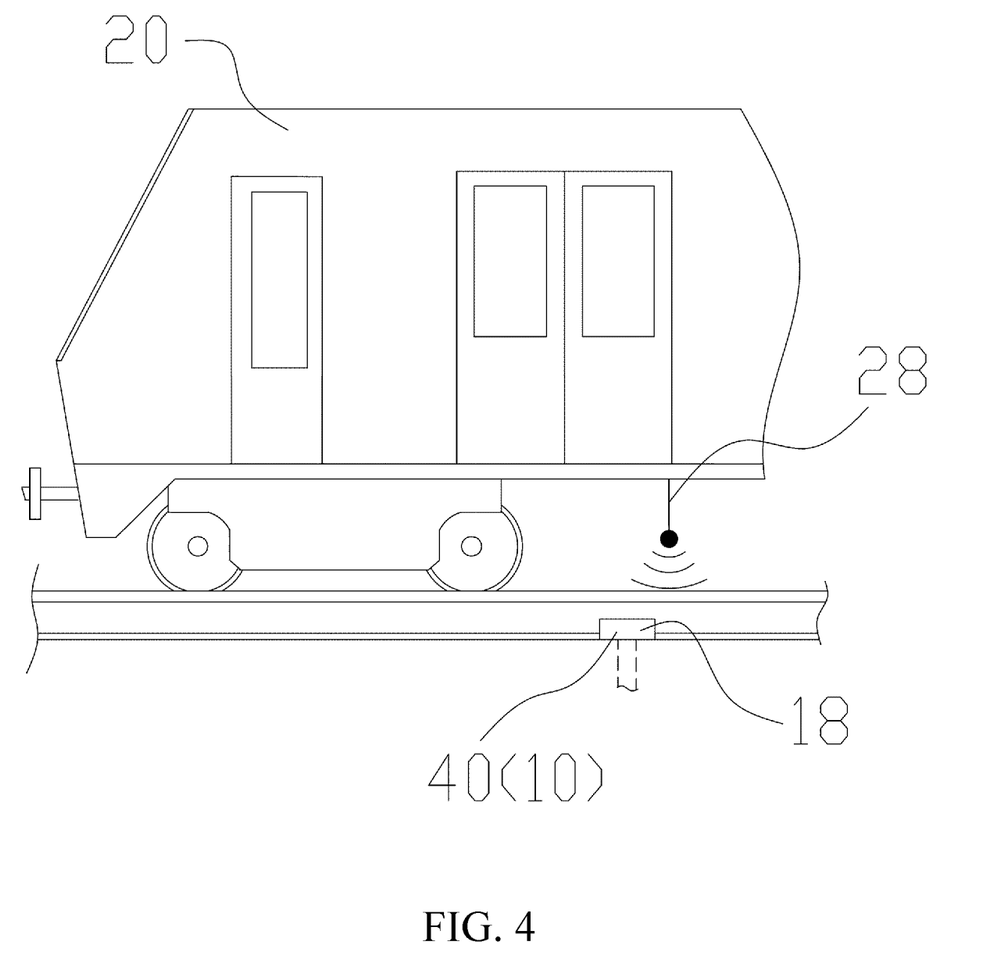
FIG. 4 is a view showing the positional relationship at the time of carrying out the information transmission process with a vehicle travelling along a railway track and a bolt.

Next, an information transmission process in the information transmission system 1 according to the embodiment will be described with reference to the flowchart shown in FIG. 3. Here, the vehicle 20 is considered as a railway vehicle, and the bolt 40 is considered as a bolt used to fix a railway track (rail). In addition, the vehicle 20 drives a motor, not shown, and travels along the railway track. Therefore, it is possible to carry out the information transmission process in which, as shown in FIG. 4, while the interval between the antenna 28 of the vehicle 20 travelling along the railway track and the antenna 18 of the bolt 40 comes close to a predetermined interval, power is supplied from the vehicle 20 side to the power receiving-type information transmission device 10 side, and information regarding strain in the bolt 40 is acquired from the power receiving-type information transmission device 10.

In addition, here, the antennas 18 and 28 are considered as loop antenna; but there is no doubt that the antennas are not limited thereto, and it is needless to say that a different linear antenna such as a dipole antenna, a plate-like antenna, a planar antenna, or the like is preferably used as long as the antennas are capable of realizing the electromagnetic induction method.

The vehicle-side control unit 22 causes the power supply unit 24 to supply power to the power receiving-type information transmission device 10 when the vehicle 20 is positioned substantially above the bolt 40 and the antenna 18 of the power receiving-type information transmission device 10 enters the communication range of the antenna 28 (step S1). That is, when the vehicle 20 passes over the bolt 40, a line of magnetic force generated in the antenna 28 of the vehicle 20 reaches the antenna 18 of the power receiving-type information transmission device 10, and a current flows into the antenna 18 to supply power.

The device-side control unit 12 causes the power receiving unit 14 to receive power through the antenna 18 (step SA1). In addition, the device-side control unit 12 feeds power to each unit (step SA2). Here, storage using the fed power is carried out in the capacitor 15.

The device-side control unit 12 causes the information acquisition unit 16 to acquire the amount of a change in the physical change of the bolt 40 (step SA3). For example, the information acquisition unit 16 measures the voltage (or resistance value) of the strain measurement sensor, compares the measured voltage (or resistance value) and the voltage (or resistance value) of the strain measurement sensor in the initial state, which is stored in the storage unit 13 in advance, calculates and acquires the amount of a change in strain. It should be noted that the information acquisition unit 16 may be configured to directly use the value of strain detected by the strain measurement sensor instead of acquiring the amount of a change. In such a case, it is possible to lessen the load of the process that the power receiving-type information transmission device 10 executes.

In addition, since information can be transmitted and received between the power receiving-type information transmission device 10 and the vehicle 20 in the communication range of the antenna 18, the device-side control unit 12 causes the communication unit 17 to transmit the identifier that is contained in the storage unit 13 and the amount of a change acquired in the step SA3 through the antenna 18 (step SA4).

On the other hand, the vehicle-side control unit 22 causes the vehicle communication unit 26 to receive the identifier and the amount of a change from the power receiving-type information transmission device 10 through the antenna 28 (step S2) and ends the information transmission process.

As described above, the bolt 40 in which the power receiving-type information transmission device 10 is mounted is applied to the railway track, and the vehicle 20 is caused to travel along the railway track, whereby power is supplied to the power receiving-type information transmission device 10 from the vehicle 20, and, at the same time, the power receiving-type information transmission device 10 acquires the amount of a change in strain generated in the bolt 40 and transmits the amount of a change to the vehicle 20 side. Therefore, regardless of the communication distance, the power receiving-type information transmission device 10 is capable of regularly or steadily acquiring the amount of a change in strain generated in the bolt 40. In addition, it is possible to stably transmit the acquired amount of a change in strain to the vehicle 20 side.

In addition, the amounts of a change in strain are collected, whereby it is possible to objectively determine the statuses of the bolt and the railway track (rail) to which the bolt is applied, stress that acts on the bolt and the railway track (rail), or the like, and it is possible to determine a place and a time at which maintenance is carried out on the railway track (rail) to which the bolt is applied.

It should be noted that, in the above-described embodiment, the bolt in which the power receiving-type information transmission device is mounted is applied to a place to which the rail is fixed, but there is no doubt that the place to which the bolt is applied is not limited thereto, and the place to which the bolt is applied can be appropriately set; for example, the bolt may be applied to fix a joint bar. With no doubt, it is needless to say that, as the long body, which is the measurement object in which the power receiving-type information transmission device is provided, not only a screw fastening member such as a bolt but also a long body such as a rail may be used as the measurement object, and the information acquisition means such as strain measurement means or temperature measurement means may be directly provided in the configuration.

In addition, in the above-described embodiment, a case where the power receiving-type information transmission device is mounted in the bolt has been described as an example, but the configuration is not limited thereto, and the power receiving-type information transmission device may be mounted in a fastening member other than the bolt, for example, a nut, a washer, a joint bar, or the like. In addition, the power receiving-type information transmission device may be mounted in a member other than the fastening member, for example, a long body that has a large length and high stiffness, like a metal (steel), such as a track (a rail and/or a sleeper), a beam, a pillar, a pipe, a steel pipe, a guard rail, a reinforcing bar, a underwater cable, shaped steel (H-section steel, I-section steel, T-section steel, angle steel, flat steel, channel steel, Z-section steel, a steel sheet pile, or the like).

In addition, the antenna 18 is disposed in the hollow portion 46 in the top portion 42, but the configuration is not limited thereto, and the antenna 18 may also be disposed in the shaft portion 44 or at the front end portion of the shaft portion 44. In addition, the antenna 18 may be disposed in the screw portion 44a by providing the hollow portion 46 up to the front end side of the screw portion 44a. In addition, the antenna 18 may also be disposed along the bottom portion of the male screw groove of the screw portion 44a, and, in this case, the male screw groove is preferably formed deep in order to prevent the antenna 18 from coming into contact with a female screw thread of a member to be fastened.

In addition, a plurality of the power receiving-type information transmission devices 10 may be disposed in one long body. In this case, the access mode of the information transmission system 1 is set to a first in first out (FIFO) access mode, a multi access mode, or a selective access mode.

It should be noted that, in the FIFO access mode, it is possible to communicate in turn with the power receiving-type information transmission devices 10 that enter in turn the communication range of the antenna 28 of the vehicle 20. Since an access prohibition process is carried out on the power receiving-type information transmission device 10 that has finished communication, even when there is a plurality of the power receiving-type information transmission devices 10 that has finished communication in the communication range of the antenna 28, communication is still possible as long as only one new power receiving-type information transmission device 10 enters the communication range of the antenna 28. However, when the power receiving-type information transmission devices 10 enter the communication range at the same time, a communication error occurs, and communication becomes impossible. An access-inhibited power receiving-type information transmission device 10 becomes communicable again when exiting from the communication range.

In the multi access mode, even when there is a plurality of the power receiving-type information transmission devices 10 in the communication range of the antenna 28, it becomes possible to communicate with all of the power receiving-type information transmission devices 10.

In the selective access mode, since it is possible to communicate with a specific power receiving-type information transmission device 10 among a plurality of the power receiving-type information transmission devices 10 present in the communication range of the antenna 28, numbers indicating a communication object are assigned to the identifier of the power receiving-type information transmission devices 10 present in the communication range in advance, and communication with the specific power receiving-type information transmission device 10 is carried out based on the assigned number.

In addition, even in a case where a plurality of the power receiving-type information transmission devices is disposed in one long body, since the amount of a change in each strain is transmitted to the vehicle side simply by causing the vehicle to travel, it is possible to efficiently collect the amounts of a change in strain acquired by the respective power receiving-type information transmission devices.

Figure 5:
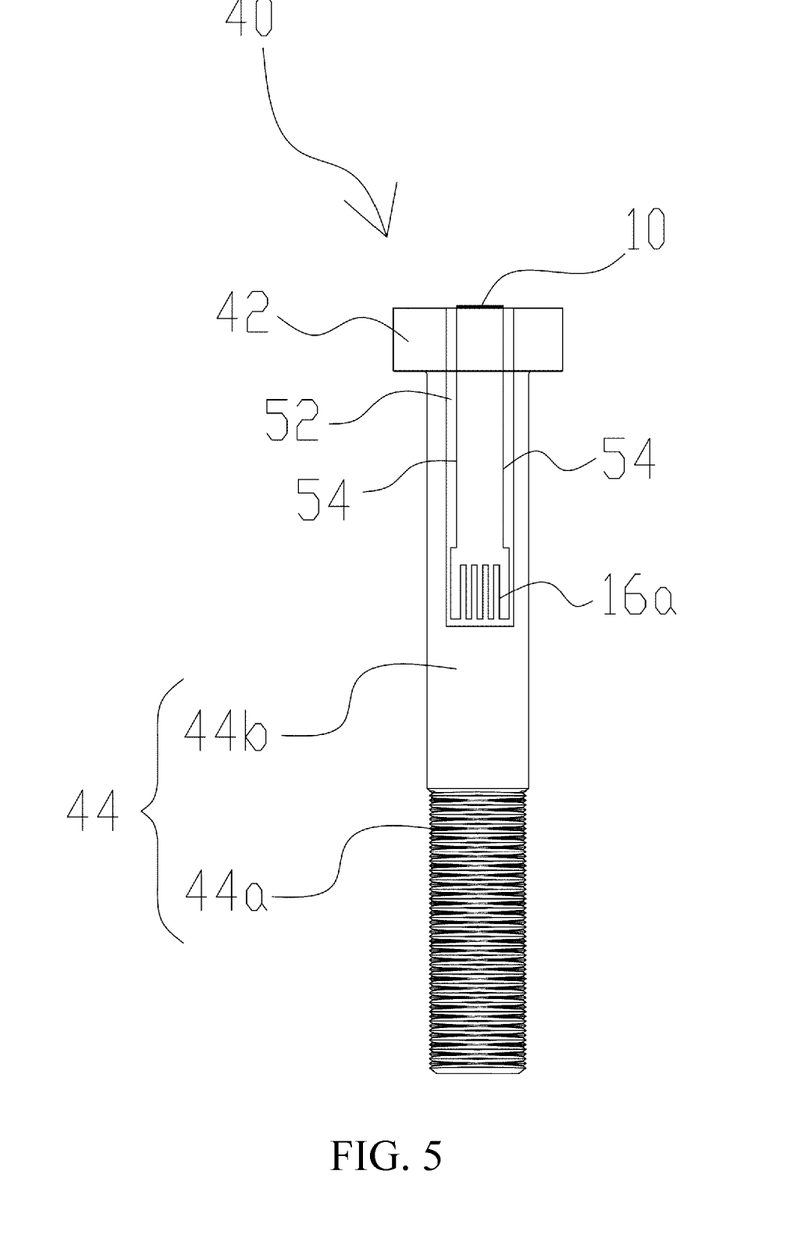
FIG. 5 is a view showing a different disposition example of the power receiving-type information transmission device.

In addition, in the above-described embodiment, the case where the power receiving-type information transmission device 10 is disposed tin he hollow portion 46 of the bolt 40 has been described as an example; however, as shown in FIG. 5, the power receiving-type information transmission device 10 may be disposed at the top portion of the bolt 40 instead of the hollow portion 46.

At this time, a wire 54 that connects the strain measurement sensor 16a directly formed on the outer circumferential surface of the cylindrical portion 44b and the power receiving-type information transmission device 10 may be disposed along the outer circumferential surface of the cylindrical portion 44b and the seating surface, outer circumferential surface, and top surface of the top portion 42. In a case where the wire 54 is disposed along the cylindrical portion 44b and the top portion 42, since there is a concern that the wire 54 may come into contact with a member to be fastened and break at the time of fastening the bolt 40, it is preferable to provide a series of disposition path 52 that forms a cross-sectional recess shape throughout the outer circumferential surface of the cylindrical portion 44b and the seating surface, outer circumferential surface, and top surface of the top portion 42 so as to be along the path of the wire 54.

In addition, the wire 54 that connects the strain measurement sensor 16a and the power receiving-type information transmission device 10 may be a conduction path directly formed on the surface of the bolt 40 in the same manner as the strain measurement sensor 16a. The conduction path in this ease can be directly formed on the electric insulating layer by lamination printing, pad printing, painting, plating, ink jet printing, sputtering, or the like in which a conductive paste is used. In such a case, it is possible to form the strain measurement sensor 16a and the wire 54 (conduction path) in series.

Figure 6:
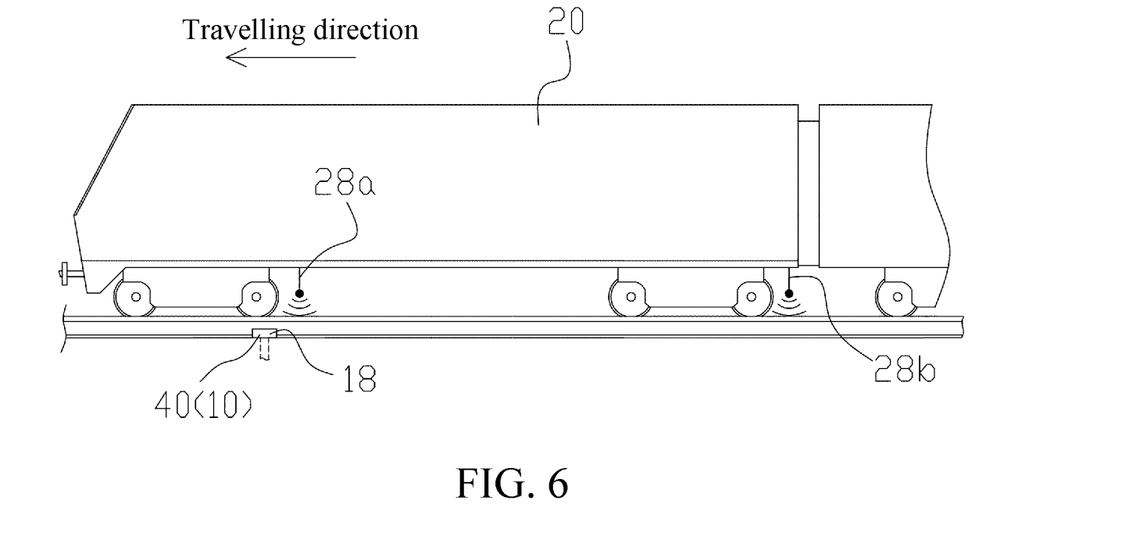
FIG. 6 is a view showing a vehicle in which a plurality of antennas is disposed.

In addition, in the above-described embodiment, the power supply unit 22 supplies power to the power receiving-type information transmission device 10 through one antenna 28, and the vehicle communication unit 26 receives the amount of a change in the physical change of the bolt 40 from the power receiving-type information transmission device 10, but the configuration is not limited thereto, and separate antennas may be provided for power supply and for the reception of the amount of a change. That is, as shown in FIG. 6, two moving body-side antennas 28a and 28b may be provided, one moving body-side antenna 28a may be used as an antenna for the power supply unit 22 to supply power to the power receiving-type information transmission device 10, and the other moving body-side antenna 28b may be used as an antenna for the vehicle communication unit 26 to receive the information of the amount of a change from the power receiving-type information transmission device 10.

In this case, the moving body-side antennas 28a and 28b are preferably disposed to be separated from each other along the travelling direction of the vehicle 20. Specifically, the moving body-side antenna 28a for supplying power to the power receiving-type information transmission device 10 is disposed in front in the travelling direction, and the moving body-side antenna 28b for receiving the information of the amount of a change is disposed in the rear in the travelling direction. In such a case, while the power receiving-type information transmission device 10 receives power, then, acquires the amount of a change in the physical change of the holt 40 with the information acquisition unit 16, and transmits the amount of a change, even when the moving body-side antenna 28a of the vehicle 20 exits from the communicable range, the moving body-side antenna 28b positioned in the rear is positioned in the communicable range and is thus capable of reliably receiving the information of the amount of a change.

Figure 7:
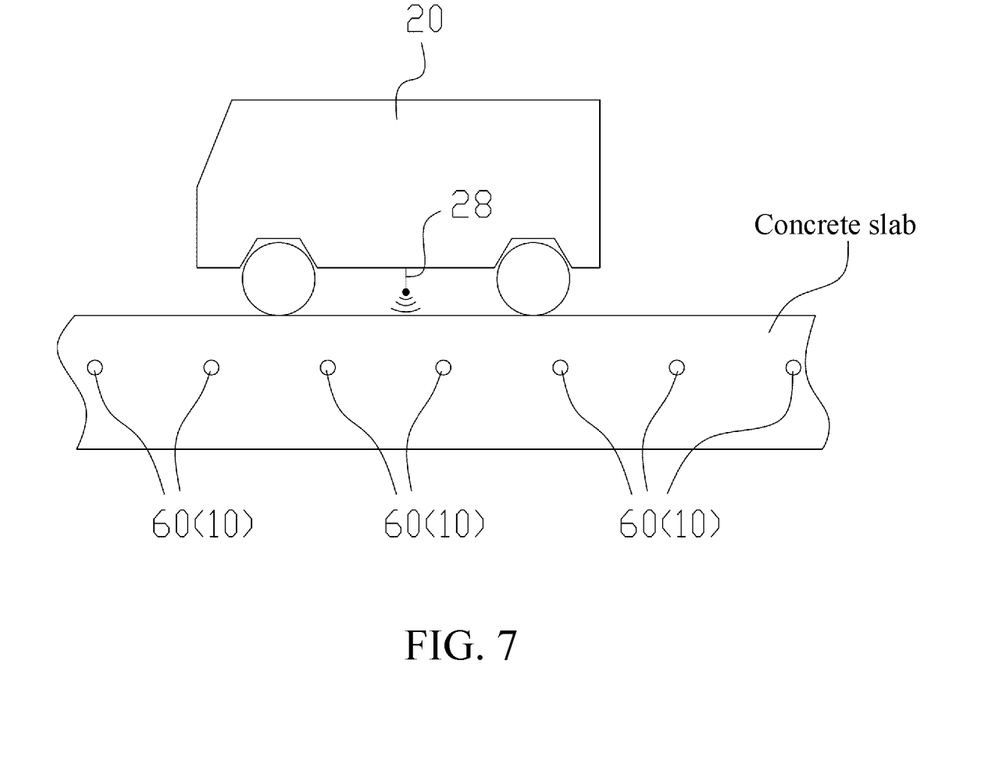
FIG. 7 is a view showing a vehicle passing on a concrete slab in which reinforcing bars having the power receiving-type information transmission device are buried.

It should be noted that, when information acquisition means such as a strain measurement sensor or a temperature sensor is provided in a reinforcing bar together with the power receiving-type information transmission device 10, it is possible to acquire information of the amount of displacement of strain that is applied to a concrete slab formed by burying the reinforcing bar or the like. Specifically, a plurality of reinforcing bars 60 each provided with information acquisition means such as a strain measurement sensor or a temperature sensor together with the power receiving-type information transmission device 10 is disposed in a concrete slab in a road bridge in a desired direction such as a longitudinal direction, a lateral direction, or a vertical direction, and the vehicle 20 is caused to travel on the road bridge as an inspection vehicle.

In such a case, as shown in FIG. 7, the vehicle 20 is capable of receiving the amount of displacement of strain or the like from the power receiving-type information transmission devices 10 in the reinforcing bars 60 by passing on the concrete slab. In addition, when a plurality of the reinforcing bars 60 is disposed on the travelling path of the vehicle 20 in the concrete slab, the vehicle-side control unit 22 is capable of sequentially acquiring the amounts of displacement from the respective reinforcing bars 60. Therefore, it becomes possible to collect information of damage or the like in all or part of the concrete slab simply by causing the vehicle 20 to travel on the concrete slab. Here, the concrete slab has been described as an example; however, with no doubt, it is needless to say that the structure in which the reinforcing bars are buried is not necessarily a concrete slab, but may be, in addition to reinforced concrete such as a precast reinforced concrete product or cast-in-place reinforced concrete, a structure formed by burying a steel pipe in concrete or the ground.

In addition, the information transmission system to which the vehicle is applied has been described as an example, but the moving body is not limited thereto, and the moving body may be, for example, an unmanned aircraft such as a drone, a remotely-operable radio control travelling car, a radio control ship, a robot for underwater cable repair and inspection, or the like as long as the moving body is configured to be relatively movable along a track relative to a member that serves as a measurement object having the power receiving-type information transmission device.

BRIEF DESCRIPTION OF THE REFERENCE SYMBOLS

1—Information transmission system
10—Power receiving-type information transmission device
12—Device-type control unit
13—Storage unit
14—Power receiving unit
15—Capacitor
16—Information acquisition unit
16a—Strain measurement sensor
17—Communication unit
18, 28—Antenna
20—Vehicle
22—Vehicle-side control unit
24—Power supply unit
26—Vehicle communication unit
40—Fastening member
42—Top portion
44—Shaft portion
44a—Screw portion
44b—Cylindrical portion
46—Hollow portion
48—Opening portion

The invention claimed is:

1. An information transmission system comprising:
a power receiving-type information transmission device that is mounted on a measurement object; and
a moving body having a motor that is movable relative to the power receiving-type information transmission device,
wherein the power receiving-type information transmission device comprises:
a power receiver configured to wirelessly receive power supply from the moving body configured to be movable along a track;
an information acquisition sensor configured to acquire information regarding a physical change occurring in the measurement object by consuming power obtained by the power receiver; and
a transmitter configured to wirelessly transmit the information to the moving body by consuming the power obtained by the power receiver, and
wherein the moving body comprises:
a first moving body-side antenna configured to supply the power to the power receiving-type information transmission device,
a second moving body-side antenna configured to receive the information transmitted from the power receiving-type information transmission device, while moving in a direction toward the power receiving-type information transmission, the second moving body-side antenna being arranged to be spaced behind the first moving body-side antenna in a traveling direction of the moving embody; and
a moving body-side control unit comprising a non-transitory computer readable medium storing instructions thereon that cause the moving body-side control unit to:
cause the first moving body-side antenna to supply the power while the moving body is moving; and
cause the second moving body-side antenna to receive the information transmitted from the power receiving-type information transmission device while the moving body is moving.

2. The system of claim 1, wherein the first moving body-side antenna supplies the power by an electromagnetic induction method.

3. The system of claim 1, wherein the moving body is a manned or unmanned vehicle, an aircraft, a ship, or a robot.

4. The system of claim 1, wherein the second moving body-side antenna receives the information by an electromagnetic induction method.

5. The system of claim 1, wherein the information acquisition sensor acquires the information of an amount of the physical change relative to a predetermined state as a criterion.

6. The system of claim 1, wherein the transmitter transmits the information with a loop antenna,
the power receiver receives the power with the loop antenna, and
the power receiving-type information transmission device has electric storage for storing the power fed with the power receiver.

7. The system of claim 1, wherein the measurement object is at least one of a fastening member or a stiff body, and
in a case where the measurement object is the fastening member, a loop antenna is disposed in a top portion and/or a front end portion of the fastening member.

8. The system of claim 1, wherein the power receiver receives the power supply by an electromagnetic induction method, and
the transmitter transmits the information by the electromagnetic induction method.

9. A moving body, wherein the moving body is movable relative to a power receiving-type information transmission device that acquires information regarding a physical change occurring in a measurement object, and wherein the moving body comprises:
a first moving body-side antenna configured to supply power to the power receiving-type information transmission device;
a second moving body-side antenna configured to receive the information transmitted from the power receiving-type information transmission device, while moving in a direction toward the power receiving-type information transmission device, the second moving body-side antenna being arranged to be spaced apart from the first moving body-side antenna in a traveling direction of the moving body, the second moving body-side antenna located at a back of the moving body in the traveling direction; and
a moving body-side control unit comprising a non-transitory computer readable medium storing instructions thereon that cause the moving body-side control unit to:
cause the first moving body-side antenna to supply the power while the moving body is moving; and
cause the second moving body-side antenna to receive the information transmitted from the power receiving-type information transmission device while the moving body is moving.

10. The moving body of claim 9, wherein:
the second moving body-side antenna receives the information with a second moving body-side loop antenna by an electromagnetic induction method.

11. The moving body of claim 9, wherein the moving body is a manned or unmanned vehicle, an aircraft, a ship, or a robot.

12. The moving body of claim 9, wherein the first moving body-side antenna supplies the power by an electromagnetic induction method.

\* \* \* \* \*

UNITED STATES PATENT AND TRADEMARK OFFICE
CERTIFICATE OF CORRECTION

| | |
|---|---|
| PATENT NO. | : 11,894,699 B2 |
| APPLICATION NO. | : 16/961879 |
| DATED | : February 6, 2024 |
| INVENTOR(S) | : Hiroshi Michiwaki |

It is certified that error appears in the above-identified patent and that said Letters Patent is hereby corrected as shown below:

In the Specification

| | | |
|---|---|---|
| Column 1, | Line 5, | insert heading --CROSS-REFERENCE TO RELATED APPLICATIONS-- |
| Column 1, | Line 7, | insert paragraph --This application is a national phase entry under 35 U.S.C. § 371 of International Patent Application PCT/JP2019/000758, filed January 11, 2019, designating the United States of America and published as International Patent Publication WO 2019/139142 A1 on July 18, 2019, which claims the benefit under Article 8 of the Patent Cooperation Treaty to Japanese Patent Application Serial No. 2018-003873, filed January 12, 2018.-- |
| Column 5, | Line 41, | change "the hollowing portion" to --the hollow portion-- |
| Column 9, | Lines 6-7, | change "to the identifier of" to --to the identifiers of-- |
| Column 9, | Line 21, | change "disposed tin he hollow" to --disposed in the hollow-- |
| Column 9, | Line 48, | change "this ease can" to --this case can-- |
| Column 9, | Line 55, | change "power supply unit 22 to supply power" to --power supply unit 24 to supply power-- |
| Column 9, | Line 65, | change "power supply unit 22 to supply power" to --power supply unit 24 to supply power-- |
| Column 10, | Line 16, | change "the holt 40 with" to --the bolt 40 with-- |
| Column 11, | Line 10, | change "12—Device-type control unit" to --12—Device-side control unit-- |

Signed and Sealed this
Ninth Day of April, 2024

Katherine Kelly Vidal
*Director of the United States Patent and Trademark Office*

CERTIFICATE OF CORRECTION (continued)
U.S. Pat. No. 11,894,699 B2

In the Claims

Claim 1, Column 11, Line 59, change "moving embody; and" to --moving body; and--